Aug. 14, 1928.

L. T. MURPHY 1,680,690

CALIBRATING INSTRUMENT FOR PAPER MAKING MACHINES

Filed April 11, 1927    2 Sheets-Sheet 1

INVENTOR.
Lloyd T. Murphy

ATTORNEY.

Aug. 14, 1928.
L. T. MURPHY
1,680,690
CALIBRATING INSTRUMENT FOR PAPER MAKING MACHINES
Filed April 11, 1927     2 Sheets-Sheet 2
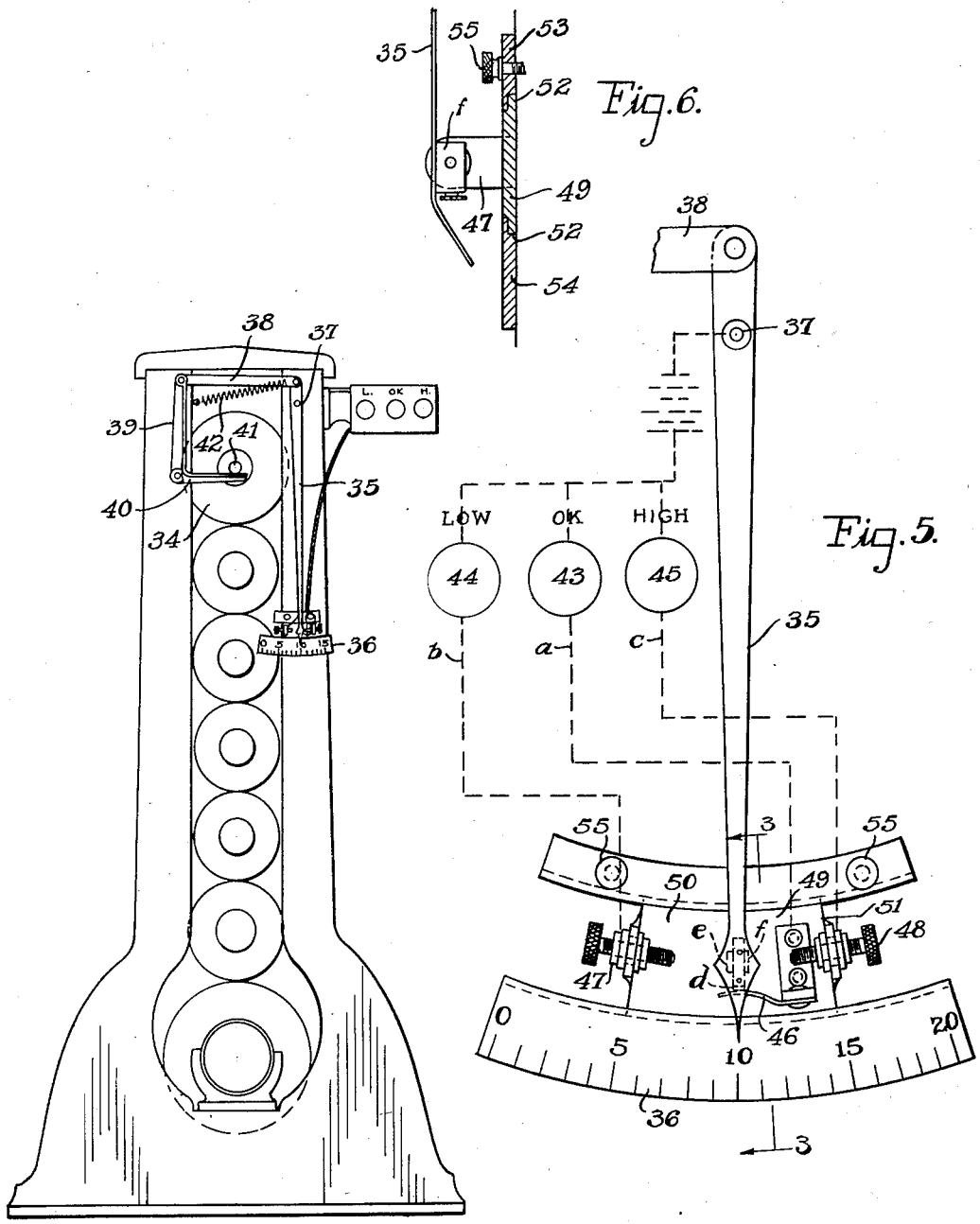

Patented Aug. 14, 1928.

1,680,690

UNITED STATES PATENT OFFICE.

LLOYD T. MURPHY, OF FRANKLIN, OHIO.

CALIBRATING INSTRUMENT FOR PAPER-MAKING MACHINES.

Application filed April 11, 1927. Serial No. 182,749.

This invention relates to improvements in calibrating instruments for paper making machines.

In the accompanying drawings which serve for illustrating the invention:

Fig. 1 is a detail view in side elevation of a paper making machine showing the instrument in one form applied thereto;

Fig. 2 corresponds to Fig. 1, illustrating a modification of the instrument;

Fig. 3 is a detail view of the calender rolls at the dry end of the machine showing the instrument applied thereto;

Fig. 4 corresponds to Fig. 3, illustrating a modification;

Fig. 5 is an enlarged detail view of Fig. 4;

Fig. 6 is a sectional view on line 6—6 of Fig. 5.

The objects attained in the invention consist in a simple form of calibrating instrument, or paper thickness gauge, adapted to be applied to standard paper making machines without changing or adding to the structure of the machines, the instruments serving to indicate constantly the thickness or number of points at which the paper is running, thus making unnecessary frequent calipering of the paper by hand methods as is the usual practice.

The improved calibrating instruments are adapted to be placed in operative relation with the press rolls at any point of the machine and may be used to advantage at both the wet and dry ends of the machine, thus to afford a double check on the run of the paper and serving as a basis for indicating the variation in thickness of the paper between the wet and dry ends or between any two points, on the machine.

The instruments are adapted to be used singly or in combination one with another, and in combination with a light signal system for constantly indicating whether the paper is running within the required limits for thickness, or over or under as the case may be, the attention of the machine operators being thus directed to the calibrating instruments which will indicate the extent of adjustments to be made of the machine for bringing the paper to normal thickness.

The instruments used in the manner indicated enable the machine operators to effect the desired calibration of the paper practically immediately, when a new run of paper is put on the machine, thus overcoming the waste in production cost in running from 1 to 3 ton of broke stock over the machine which is necessary in the common practice for bringing the paper to the required thickness.

The instruments are shown in the accompanying drawings in several forms for illustrating suitable modifications and the manner of applying the same to the machines.

The instruments are applied in each case to a part movable with a vertically movable press roll, or calender roll, as the roll journal or roll bearing, thus acting to transmit and register on the dial of the instrument the thickness of the paper passing under the roll.

Figure 1:
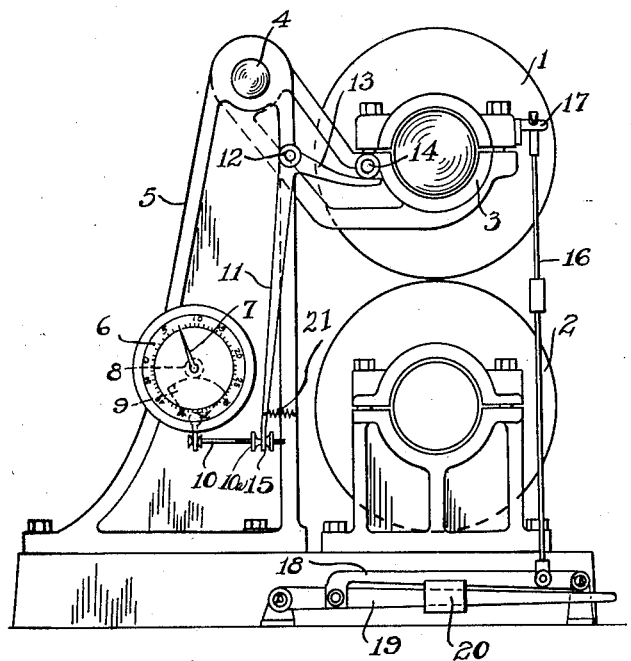

Fig. 1 of the drawings illustrates the first unit of press rolls 1—2 at the wet end of a paper making machine, the upper roll being supported in a bearing 3, pivoted at 4 on the machine frame 5. The calibrating instrument, as here shown, is of a common type consisting of a dial 6 and an indicator 7 adapted to register with the dial, the indicator being connected by a pinion 8, segmental gear 9 and link 10 to a depending arm 11 which is pivoted on the machine frame at 12, an extension 13 or the arm being in engagement with a roller 14 supported on bearing bracket 3. Thus the position of the upper press roll relative to the lower press roll and the variations of vertical movement of the upper roll will be compounded and transmitted through the connection 11—13 and registered on the dial of the instrument. An adjustable connection 15 between link 10 and arm 11 consisting in opposite nuts 10$^a$ threaded on the free end of link 10 for adjusting the end of arm 11 axially of the link serves for adjusting the instrument to register with the position of the upper press roll. A spring 21 acts to hold arm 13 in engagement with roller 14.

A compensating connection consisting of a link 16 connected at its upper end to a projection 17 of the bearing bracket 3 and at its lower end to compound weight levers 18—19 serves for holding the upper press roll in pressure relation with the paper moving between the rolls, a weight 20 adjustable on lever 19 serving for regulating the pressure of the rolls on the paper.

From the foregoing description it will be seen that vertical variations of the upper press roll will be registered on the dial of the calibrating instrument and that readings of the instrument will enable the machine operators to make any required adjustments of the machine for holding the thickness of the paper within the specified limits. As uniformity of thickness in all grades of paper is desirable, and essential in some grades for obtaining the best results in the use of the paper, the importance of the calibrating instruments as means for maintaining uniformity of thickness will be apparent.

Figure 2:
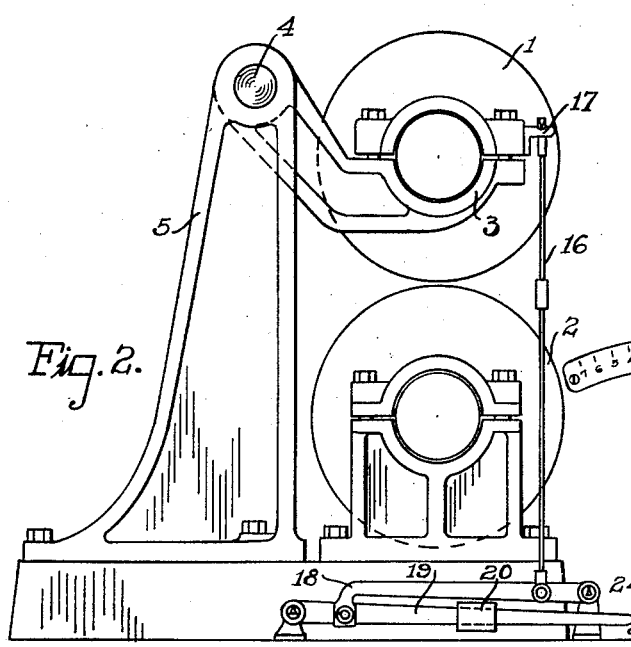

The modified instrument shown in Fig. 2 of the drawings functions the same as that shown in and described in connection with Fig. 1, the instrument consisting of an indicator 22, pivoted at 23, having an arm 24 in engagement with the end of lever 19, and registering with a scale or dial 25 for indicating the variations in the thickness of the paper, a spring 26 acting to hold the pointer arm 24 in engagement with the end of lever 19.

Figure 3:
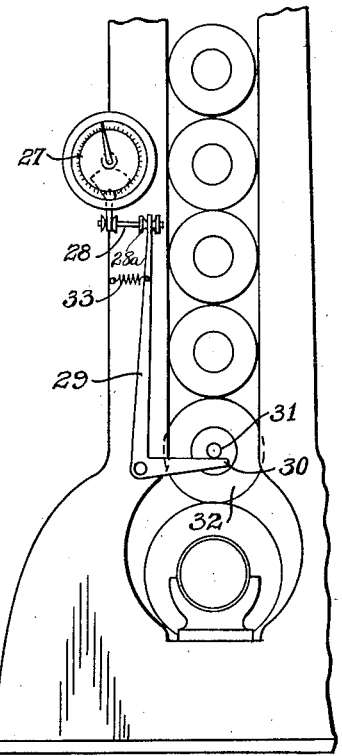

Fig. 3 illustrates the calibrating instrument as applied to the dry end, or calender rolls of the machine. As here shown the instrument 27 is connected by an adjustable link 28 and nuts 28ª threaded on the link for adjusting the end of lever 29 axially of the link to a lever 29—30 which is held in engagement with an extension 31 of the journal of the calender roll 32 by a spring 33. Thus the vertical variations of the roll, indicating the thickness of the paper, are registered on the instrument. By comparing readings of the instrument with readings of the instrument at the wet end of the machine, it will be determined how the paper is running as to thickness between the wet and dry ends of the machine.

The instrument illustrated in Fig. 4 is similar in arrangement for registering the thickness of the paper to that shown in Fig. 3, the attachment of the instrument being made to the upper calender roll 34. The means for effecting registration of the vertical variations of the roll consist of an indicator 35 adapted to register an a dial 36, the indicator being pivoted at 37 and connected by a link 38 and lever 39—40 to an extension 41 at the end of the journal of roll 34, a spring 42 acting to hold the end of lever 40 in engagement with part 41.

The instruments on the calender rolls may be used in combination with or independently one of another, and in combination with or independently of the instrument at the wet end of the machine, as the conditions of operation and specification for the finished paper may require, a closer calibration of the paper being made possible by using the instruments in combination and applied at both ends, or in any desired locations, on the machine.

The light signals are shown in combination with the instrument illustrated in Fig. 4, it being understood that this is for the purpose of illustration only and that the signals may be connected with any one or more of the instruments at convenient locations on the machine for observation.

As best shown in detail Fig. 5, the signal system consists in a plurality of electric lights 43—44—45 of different colors, as white, red and green, on circuits a—b—c respectively, with terminals 46—47—48 arranged adjacent the dial 36, and contacts d—e—f supported on the end of indicator 35. Thus when circuit a—46—d is closed, the white light 43 will be on which will indicate that the paper is running within normal thickness limits; when circuit b—47—e is closed the red light 44 will be on which will indicate that the paper is running below normal thickness limits, and when circuit c—48—f is closed the green light 45 will be on which will indicate that the paper is running above normal thickness limits. A reading of the instrument dial 36, when either of the lights 44—45 are on will show the number of points in thickness the paper is running over or under, as the case may be, which will enable the machine operators to make the necessary adjustments of the machine for bringing the paper to normal thickness.

The electric terminals 46—47—48 are supported on base plates 49—50—51 respectively, the same being dove-tailed as indicated at 52 in guide plates 53—54 and secured by set screws 55, thus adapting the terminals to be set relative to the scale 36 according to the required thickness of the paper.

Having described my invention, I claim:

1. A calibrating instrument for a paper making machine including in combination with a part of the machine, as a press roll, movable responsively to the variable thickness of the paper running on the machine, a dial associated with the instrument for registering the variations of said movement, and a lever pivoted on a fixed part of the machine and having a short arm operatively connected to said part and a relatively long arm operatively connected to the instrument for compounding and indicating the extent of said movement on said dial.

2. A calibrating instrument for a paper making machine including in combination with a part of the machine, as a press roll, movable responsively to the variable thickness of the paper running on the machine, a dial associated with the instrument for registering the variations of said movement, a member interposed between said part and the instrument for indicating the extent of said movement on the dial, and means for applying pressure on said roll for regulating said movement thereof.

3. A calibrating instrument for a paper making machine including in combination with a part of the machine, as a press roll, movable responsively to the variable thickness of the paper running on the machine, a member interposed between said part and the instrument for registering the extent of said movement thereon, and a plurality of light circuits including an intermediate circuit and lights of different colors controlled by the movements of said member for indicating respectively by said lights the mean, over and under thickness limits of the paper passing under said roll.

4. A calibrating instrument for a paper making machine including in combination with a part of the machine, as a press roll, movable responsively to the variations in thickness of the paper running on the machine, a member interposed between said part and the instrument for registering the extent of said movement thereon, and a plurality of light circuits including an intermediate circuit and relatively adjustable terminals and lights in said circuits controlled by the movements of said member for indicating respectively by said lights the mean, over and under thickness limits of the paper passing under said roll.

5. A calibrating instrument for a paper making machine including in combination with a part of the machine, as a press roll, movable responsively to the variable thickness of the paper running on the machine, a member interposed between said part and the instrument for registering the extent of said movement thereon, and a plurality of light circuits including terminals and electric contacts movable with said member into engagement with the terminals for controlling the circuits and indicating by said lights variations in the thickness of the paper passing under said roll.

In testimony whereof I affix my signature.

LLOYD T. MURPHY.